US011132239B2

(12) United States Patent
Kawai

(10) Patent No.: US 11,132,239 B2
(45) Date of Patent: Sep. 28, 2021

(54) PROCESSING APPARATUS, PROCESSING SYSTEM, AND NON-TRANSITORY COMPUTER READABLE MEDIUM

(71) Applicant: FUJIFILM Business Innovation Corp., Tokyo (JP)

(72) Inventor: Yoshikazu Kawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/140,515

(22) Filed: Sep. 24, 2018

(65) Prior Publication Data

US 2019/0227854 A1 Jul. 25, 2019

(30) Foreign Application Priority Data

Jan. 19, 2018 (JP) .............................. JP2018-007350

(51) Int. Cl.
*G06F 9/54* (2006.01)
*G06F 9/34* (2018.01)
*G06F 9/50* (2006.01)

(52) U.S. Cl.
CPC ................ *G06F 9/541* (2013.01); *G06F 9/34* (2013.01); *G06F 9/505* (2013.01)

(58) Field of Classification Search
CPC ............. G06F 9/34; G06F 9/505; G06F 9/541
See application file for complete search history.

(56) References Cited

U.S. PATENT DOCUMENTS

| 2009/0021781 | A1* | 1/2009 | Yoon ................... H04N 1/00209 358/1.15 |
| 2011/0055849 | A1 | 3/2011 | Colombo et al. |
| 2011/0078180 | A1* | 3/2011 | Nakayama .......... G06F 16/9535 707/769 |
| 2013/0246566 | A1* | 9/2013 | Asumi ..................... H04L 67/40 709/217 |
| 2017/0289383 | A1* | 10/2017 | Yanagawa ................. G06F 8/61 |

FOREIGN PATENT DOCUMENTS

JP 2011513822 4/2011

* cited by examiner

*Primary Examiner* — Charles E Anya
(74) *Attorney, Agent, or Firm* — JCIPRNET

(57) ABSTRACT

A processing apparatus includes multiple processing units and a transmission and reception unit. The multiple processing units include a first processing unit that executes a first process. The transmission and reception unit transmits process information indicating the first process to the multiple processing units. The multiple processing units include a second processing unit different from the first processing unit, and the second processing unit includes an acquisition unit that acquires a result of the first process if the first process indicated by the process information received by the second processing unit satisfies an acquisition condition specified for the second processing unit. The second processing unit executes a second process by using the acquired result of the first process.

20 Claims, 5 Drawing Sheets

FIG. 5

```
{
"Process information ID": A65DB,
"Issuing date and time": "2017-08-22 11:10",
"Processing unit ID": "FB5FA,
"Category": "Recognition",
"Class": "Speech recognition",
"Type": "Generation",
"Process result ID": "12345",
"Additional information": {Room ID": "S1501", "Sound acquisition apparatus ID": "100"},
"Acquisition target information": "http://ies01.example.com/api/12345"
}
```

FIG. 6

```
{
"Process result ID": "12345",
"Process result": "What is your recommendation?",
"Parameter ID": "100",        ⎫
"Reliability": "0.8",          ⎬  Attribute information
"Date and time": "2017-08-22 11:00", ⎭
}
```

PROCESSING APPARATUS, PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-007350 filed Jan. 19, 2018.

BACKGROUND

(i) Technical Field

The present disclosure relates to a processing apparatus, a processing system, and a non-transitory computer readable medium.

(ii) Related Art

Technology for cooperatively operating multiple processing units has been known. For example, Japanese Unexamined Patent Application Publication (Translation of PCT Application) No. 2011-513822 describes technology for connecting multiple modules on the basis of an event.

SUMMARY

Aspects of non-limiting embodiments of the present disclosure relate to a processing apparatus, a processing system, and a non-transitory computer readable medium.

In the disclosure in Japanese Unexamined Patent Application Publication (Translation of PCT Application) No. 2011-513822, to transmit an event to a specific module, the module ID (identification) of the module needs to be known in advance. Accordingly, for example, in a case where a new module is added, changing existing modules and adding the module ID of the new module are needed. In addition, processes executed by processing units include special processes such as a process incurring cost, a process involving a special resource, and a process involving relatively high processing load. For example, suppose a case where one of the processing units executes a special process and where a different one of the processing units executes a different process by using the result of the special process. In this case, executing the special process by each of the processing unit and the different processing unit doubles the special process as a whole and thus is inefficient.

It is an object of the disclosure to enable, if a new processing unit is added, a result of a process executed by one of processing units to be used by a different one of the processing units without making a change to the existing processing units.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a processing apparatus including multiple processing units and a transmission and reception unit. The multiple processing units include a first processing unit that executes a first process. The transmission and reception unit transmits process information indicating the first process to the multiple processing units. The multiple processing units include a second processing unit different from the first processing unit, and the second processing unit includes an acquisition unit that acquires a result of the first process if the first process indicated by the process information received by the second processing unit satisfies an acquisition condition specified for the second processing unit. The second processing unit executes a second process by using the acquired result of the first process.

BRIEF DESCRIPTION OF THE DRAWINGS

An exemplary embodiment of the present disclosure will be described in detail based on the following figures, wherein:

FIG. 5 is a view illustrating an example of process information;

FIG. 6 is a view illustrating an example of a response; and

DETAILED DESCRIPTION

1. Configuration

Figure 1:
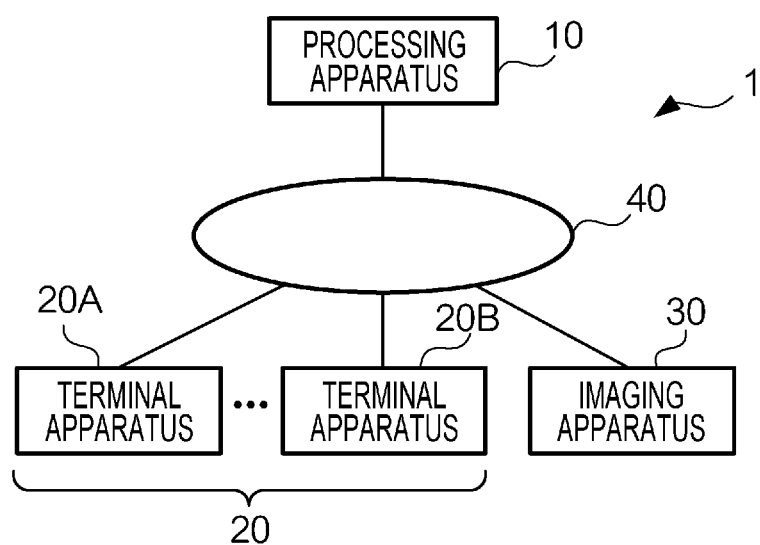
FIG. 1 is a diagram illustrating an example configuration of a processing system according to the exemplary embodiment.

FIG. 1 is a diagram illustrating an example configuration of a processing system 1 according to an exemplary embodiment. The processing system 1 provides various services to terminal apparatuses 20. The processing system 1 includes a processing apparatus 10, the multiple terminal apparatuses 20, and an imaging apparatus 30. In the example illustrated in FIG. 1, the multiple terminal apparatuses 20 include a terminal apparatus 20A and a terminal apparatus 20B. The processing apparatus 10, the terminal apparatuses 20, and the imaging apparatus 30 are connected to each other via a communication network 40.

Figure 2:
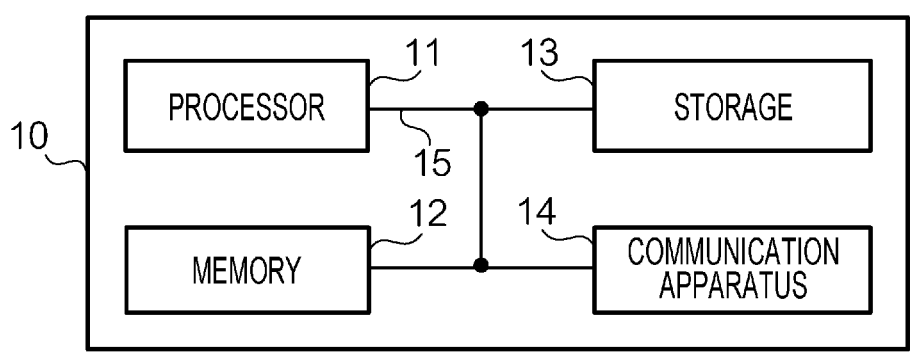
FIG. 2 is a diagram illustrating an example hardware configuration of a processing apparatus.

FIG. 2 is a diagram illustrating an example hardware configuration of the processing apparatus 10. The processing apparatus 10 executes various processes. The processing apparatus 10 may be, for example, a web server or an intelligent edge system. The processing apparatus 10 is a computer including a processor 11, a memory 12, a storage 13, and a communication apparatus 14. These apparatuses are connected to each other via a bus 15.

The processor 11 executes various processes by loading a program on the memory 12 and running the program. For example, the processor 11 may be configured as a central processing unit (CPU). The memory 12 stores programs to be run by the processor 11. For example, the memory 12 may be configured as a read only memory (ROM) or a random access memory (RAM). The storage 13 stores various pieces of data and programs. For example, the storage 13 may be configured as a hard disk drive or a flash memory. The communication apparatus 14 is a communication interface connected to the communication network 40. The communication apparatus 14 performs data communication via the communication network 40.

Each terminal apparatus 20 is used by a user and provided with a service from the processing apparatus 10. The terminal apparatus 20 is a computer including not only the same components as those of the processing apparatus 10 but also an input receiving apparatus, a display apparatus, and a sound acquisition apparatus. The input receiving apparatus is used for inputting various pieces of information. For example, the input receiving apparatus may be configured as a keyboard, a mouse, a physical button, or a touch sensor. The display apparatus displays various pieces of information. For example, the display apparatus may be configured as a liquid crystal display. The sound acquisition apparatus acquires sound. The sound acquisition apparatus is, for example, a microphone. The sound acquisition apparatus collects sound and converts the sound into a sound signal.

The imaging apparatus 30 takes an image of a subject. The imaging apparatus 30 is, for example, a video camera. The imaging apparatus 30 performs imaging on an imaging device by using an optical system, thereby takes a moving image, and converts the moving image into moving image data.

Figure 3:
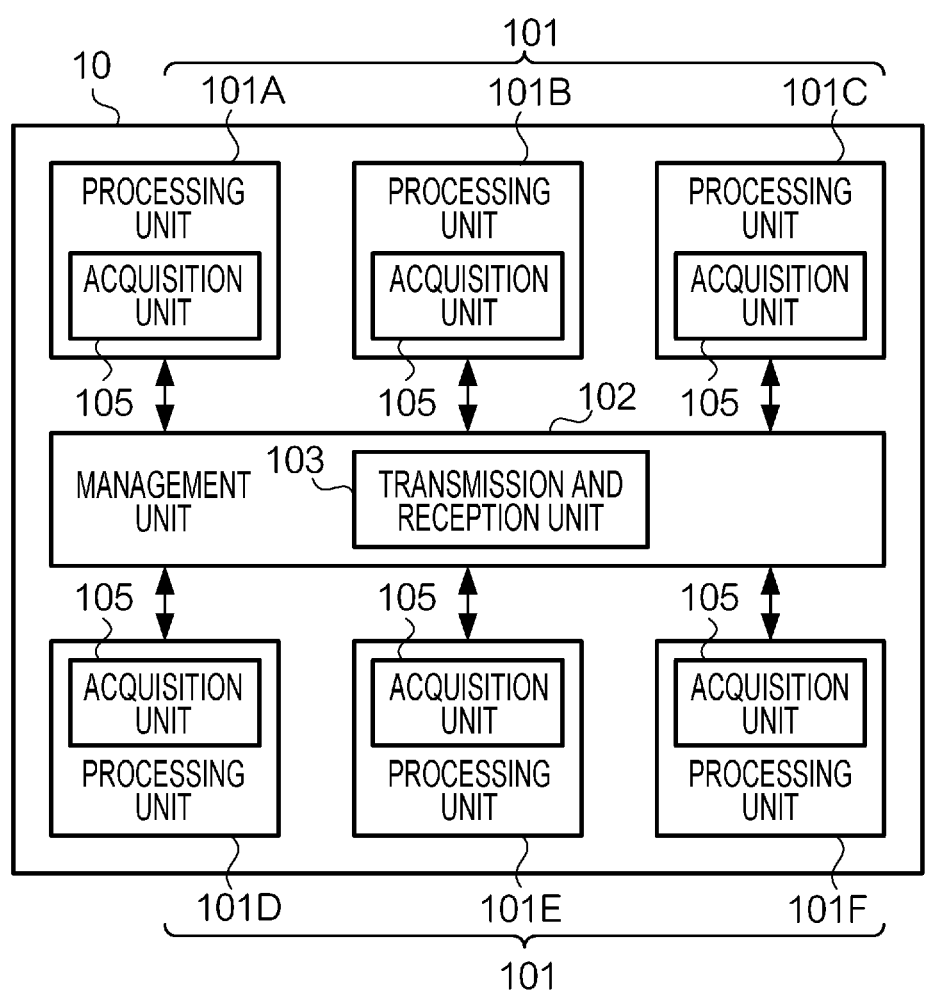
FIG. 3 is a diagram illustrating an example functional configuration of the processing apparatus.

FIG. 3 is a diagram illustrating an example functional configuration of the processing apparatus 10. The processing apparatus 10 functions as multiple processing units 101 and a management unit 102. In the example illustrated in FIG. 3, the multiple processing units 101 include processing units 101A to 101F. Note that the number of processing units 101 is not limited to the number exemplified in FIG. 3 and may be any number. The management unit 102 includes a transmission and reception unit 103. The multiple processing units 101 each include an acquisition unit 105. The functions of the processing apparatus 10 are implemented in such a manner that in cooperation with a program stored in the memory 12, the processor 11 that runs the program performs computing or controls communication performed by the communication apparatus 14.

The multiple processing units 101 execute processes different from each other and thereby provide the terminal apparatuses 20 with various services. The services may include, for example, a recommendation service, a capture service, and an affective service. The recommendation service uses speech recognition of speech of the user and provides the user with recommendation information in accordance with the result of the speech recognition. The capture service delivers moving image data representing a moving image taken by the imaging apparatus 30. The affective service is provided in accordance with a feeling of the user. Each process may be executed independently by a corresponding one of the processing units 101 or may be executed in cooperation with one of the other processing units 101 (also referred to as a different processing unit 101) or by using an external apparatus. The external apparatus may be, for example, a server apparatus that provides cloud services. In the example illustrated in FIG. 3, one of the multiple processing units 101 is used as a first processing unit, and a different processing unit 101 other than the processing unit 101 among the multiple processing units 101 is used as a second processing unit. A process executed by the processing unit 101 is used as a first process, and a process executed by the different processing unit 101 is used as a second process.

If a process executed by one of the processing units 101 satisfies a specified transmission condition, the processing unit 101 transmits process information indicating the process to the management unit 102. The transmission condition indicates, for example, a process worth using to a different processing unit 101. For example, the transmission condition may include at least one of an amount of computation in the process, a resource used for the process, and cost incurred in the process. The resource may be hardware or software. For example, a process involving a relatively large amount of computation, a process using a special resource, and a process incurring cost are considered worth using to the different processing unit 101. In this case, a condition specifying such a process may be set as the transmission condition.

The management unit 102 manages the multiple processing units 101. For example, the management unit 102 provides instances of the multiple processing units 101 and manages the instances of the processing units 101. The transmission and reception unit 103 receives process information from one of the processing units 101 and transmits the received process information to the multiple processing units 101. In the example illustrated in FIG. 3, the multiple processing units 101 apply to all of the processing units 101 connected to the management unit 102. The process information may also be transmitted by using a method in which a specific address is not designated.

If the process indicated by the process information received by one of the processing units 101 including the acquisition unit 105 satisfies an acquisition condition specified for the processing unit 101, the acquisition unit 105 acquires the result of the process. The acquisition condition is, for example, a condition specifying a process worth using to the processing unit 101. For example, if the result of a specific process is usable for a process to be executed by the processing unit 101, a condition specifying the specific process may be set as the acquisition condition. If the acquisition unit 105 acquires the result of the process, the processing unit 101 executes the process by using the acquired result of the specific process.

2. Operations

Figure 4:
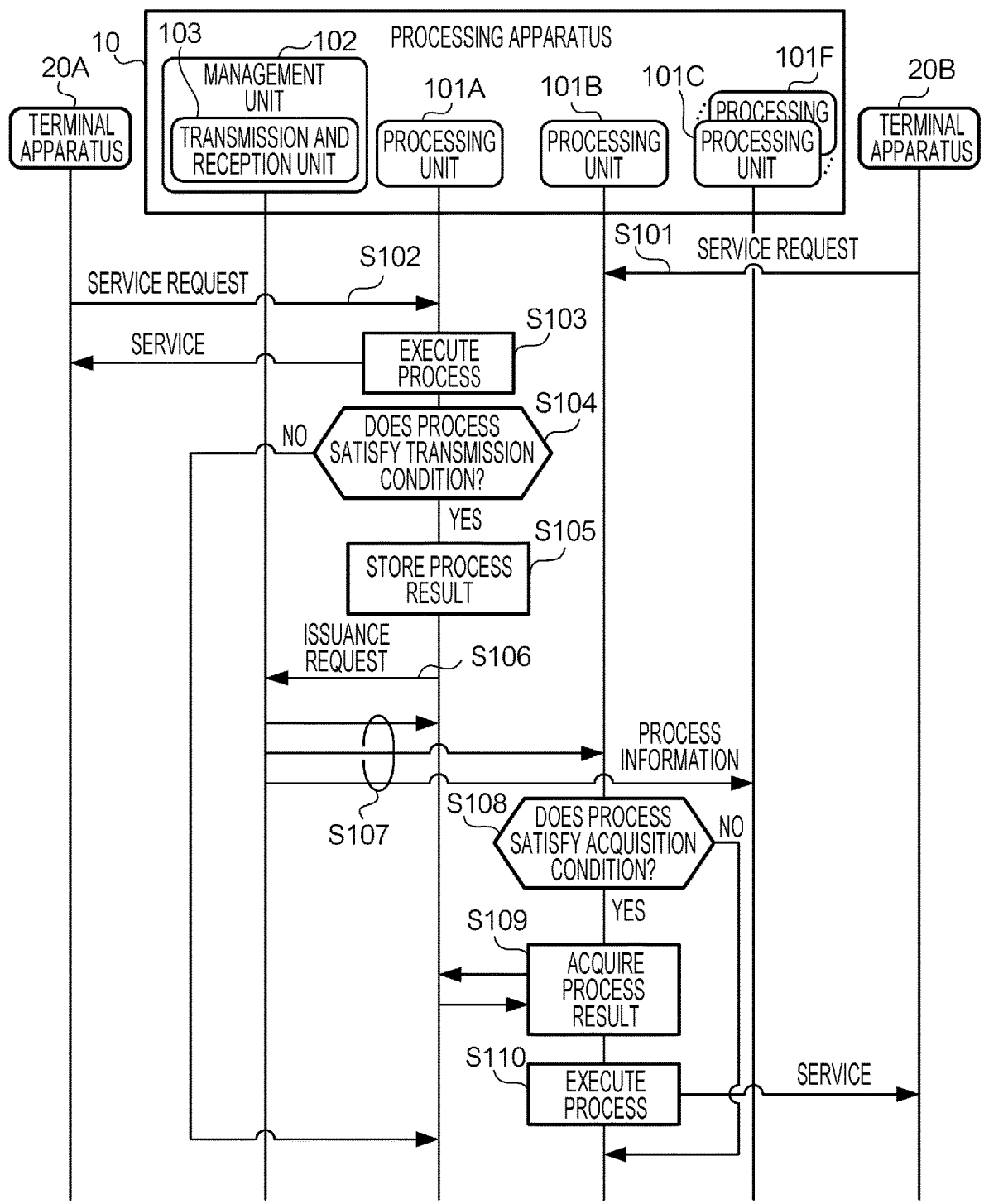
FIG. 4 is a sequence chart illustrating an example of operations of the processing system.

FIG. 4 is a sequence chart illustrating an example of operations of the processing system 1. The description below assumes the following case. The processing unit 101A provides a recommendation service, and the processing unit 101B provides a capture service. The sound acquisition apparatus of the terminal apparatus 20A and the imaging apparatus 30 are installed in the same location.

In step S102, the terminal apparatus 20A transmits a request for a recommendation service to the processing apparatus 10. The processing unit 101A receives the request from the terminal apparatus 20A.

In step S103, the processing unit 101A executes a process for providing the recommendation service. In this case, a speech signal representing speech acquired by the sound acquisition apparatus of the terminal apparatus 20A is transmitted from the terminal apparatus 20A to the processing apparatus 10. The processing unit 101A executes a speech recognition process on the speech signal and generates text data representing the content of the speech of the user. The processing unit 101A transmits the text data to a recommendation engine and acquires recommendation information related to the content of the speech of the user from the recommendation engine. If the recommendation engine is installed in an external apparatus, the processing unit 101A may acquire the recommendation information from the external apparatus. The processing unit 101A transmits the acquired recommendation information to the terminal apparatus 20A. The terminal apparatus 20A is thereby provided with the recommendation service.

Upon completion of the process executed in step S103, the processing unit 101A judges whether the process satisfies the transmission condition in step S104. The transmission condition may be, for example, a condition specifying at least one of a process involving a larger amount of computation than a predetermined amount, a process using a predetermined special resource, and a process incurring cost. If the process does not satisfy the transmission condition (step S104: NO), the process is terminated. In contrast, if the process satisfies the transmission condition (step S104: YES), the processing unit 101A proceeds to step S105.

In step S105, the processing unit 101A stores the result of the process executed in step S103 (hereinafter, referred to as a "process result") in the memory 12 or the storage 13. In this example, the text data that is the result of the speech recognition process is stored in the memory 12 or the storage 13.

In step S106, the processing unit 101A transmits an issuance request for process information indicating the process executed in step S103 to the management unit 102. The issuance request includes the process information.

FIG. 5 is a view illustrating an example of the process information. In this example, the process information includes a process information ID, an issuing date and time, a processing unit ID, a category, a class, a type, a process result ID, additional information, and acquisition target information. Note that the format of the process information may be open to the multiple processing units 101 in advance.

The process information ID is information identifying process information requested to be issued. The issuing date and time is the date and time when the process information is issued. The processing unit ID is information identifying the processing unit 101A having executed the process. The category and the class are information indicating the classification of the process executed by the processing unit 101A. The type is information indicating the type of the process executed by the processing unit 101A. The process result ID is information identifying a process result stored by the processing unit 101A. The additional information is additional information regarding the process executed by the processing unit 101A. The additional information may include, for example, information indicating a location where data used for the process is acquired or information indicating an apparatus that acquires the data. The acquisition target information is information indicating a target from which the process result is to be acquired. For example, the acquisition target information may be an address of a location where the process result is stored.

In step S107, the transmission and reception unit 103 performs broadcast of the process information included in the received issuance request from the processing unit 101A. The process information is thereby transmitted to all of the processing units 101 connected to the management unit 102.

In step S108, upon receiving the process information from the transmission and reception unit 103, each processing unit 101 judges whether the process executed by the processing unit 101A satisfies an acquisition condition specified for the processing unit 101. The processing unit 101 performs the judgment on the basis of the received process information. If the process executed by the processing unit 101A does not satisfy the acquisition condition (step S108: NO), the process is terminated. In contrast, if the process executed by the processing unit 101A satisfies the acquisition condition (step S108: YES), the processing unit 101 proceeds to step S109.

Hereinafter, the operations of the processing unit 101B will be described taken as an example. Note that the same operations as those of the processing unit 101B are performed also in each different processing unit 101. As described above, the processing unit 101B provides the capture service that delivers a moving image. In this example, the moving image has been taken in a room identified with the room ID "S1501". It is useful to provide the capture service with the result of recognition of the speech acquired in the same room together with the moving image. In this case, an acquisition condition for the processing unit 101B may be, for example, a condition in which the category is "Recognition", the class is "Speech recognition", and the room ID is "S1501". The acquisition condition is satisfied in the example illustrated in FIG. 5. In this case, the processing unit 101B proceeds to step S109.

In step S109, the acquisition unit 105 of the processing unit 101B (hereinafter, referred to as an "acquisition unit 105B") acquires the process result from the processing unit 101A. Specifically, the acquisition unit 105B transmits a request for the process result to the processing unit 101A. In response to the request, the processing unit 101A transmits a response including the process result to the processing unit 101B. The acquisition unit 105B receives the response from the processing unit 101A.

FIG. 6 is a view illustrating an example of the response. In this example, the response includes a process result ID, the process result, and attribute information of the process result. Note that the format of the response may be open to the multiple processing units 101 in advance. The process result ID is the same as the process result ID included in the process information serving as the target of the issuance request. The process result is the process result stored by the processing unit 101A in step S105 described above. The process result is read from the memory 12 or the storage 13 and then is used. The attribute information is information indicating the attribute of the process result. In this example, the attribute information includes a parameter ID, reliability, and a date and time. The parameter ID is information identifying a parameter used for the process executed by the processing unit 101A. The reliability is a value indicating the reliability of the process. For example, a larger value of the reliability indicates higher reliability of the process. The date and time indicates the date and time when the process result is stored.

In step S110, the processing unit 101B executes the process for providing the capture service by using the process result acquired in step S109. In this example, the terminal apparatus 20B requests the processing unit 101B to provide the capture service in step S101. Note that step S101 may be performed at any timing before step S110. In this case, the imaging apparatus 30 transmits, to the processing apparatus 10, moving image data representing a moving image taken by the imaging apparatus 30. On the basis of the moving image data and the process result, the processing unit 101B generates subtitled moving image data representing a moving image subtitled with text indicating the content of the speech of the user. In the example illustrated in FIG. 6, the text data representing the content of the speech of the user, that is, "What is your recommendation?" is acquired as the process result. In this case, the subtitled moving image data representing the moving image subtitled with the text "What is your recommendation?" is generated. The processing unit 101B transmits the subtitled moving image data thus generated to the terminal apparatus 20B. The terminal apparatus 20B is thereby provided with the capture service.

According to the above-described exemplary embodiment, the processing unit 101B uses the result of the process executed by the processing unit 101A. That is, the processing unit 101A and the processing unit 101B share the result of the process executed by the processing unit 101A.

In the above-described exemplary embodiment, an address is not designated when process information is transmitted.

Instead, the process information is transmitted through broadcast. If a new processing unit 101 is added to the processing apparatus 10, and even if the transmission and reception unit 103 does not know the address of the new processing unit 101, process information is transmitted to the new processing unit 101. In addition, if a new processing unit 101 is added, the result of a process executed by a different processing unit 101 may be used by the new processing unit 101 without making a change to the existing processing units 101 because process information is transmitted from the management unit 102 to the multiple processing units 101.

3. Modification

The above-described exemplary embodiment is an example of the present disclosure. The disclosure is not limited to the above-described exemplary embodiment. For example, the above-described exemplary embodiment may be modified as follows. In addition, two or more modifications of the modifications below may be combined together and then be implemented.

In the above-described exemplary embodiment, by using the result of a process executed by a specific processing unit 101, a process is executed by a different processing unit 101. The result of the process executed by the different processing unit 101 may be used by a still another different processing unit 101. In this modification, one of the multiple processing units 101 that is other than the specific processing unit 101 and the different processing unit 101 is used as a third processing unit. The following case will herein be described taken as an example. Specifically, the specific processing unit 101 is the processing unit 101A, one of the different processing units 101 is the processing unit 101B, and one of the processing units 101 that is other than the specific processing unit 101 and the different processing unit 101 is a processing unit 101C.

In this case, if the process executed by using the result of the process executed by the processing unit 101A satisfies the specified transmission condition, the processing unit 101B transmits, to the management unit 102, the process information indicating the process executed by using the result of the process executed by the processing unit 101A. In this modification, the process information indicating the process of the processing unit 101A described in the above-described exemplary embodiment is used as first process information, and process information indicating the process executed by the processing unit 101B by using the result of the process executed by the processing unit 101A is used as second process information. The transmission and reception unit 103 receives the process information from the processing unit 101B and transmits the received process information to all of the processing units 101. If the process indicated by the process information received by the processing unit 101C satisfies an acquisition condition specified for the processing unit 101C, the acquisition unit 105 of the processing unit 101C acquires the result of the process executed by the processing unit 101B. The processing unit 101C executes a process by using the process result acquired by the acquisition unit 105. For example, the process is executed by using subtitled moving image data that is the result of the process executed by the processing unit 101B. In this modification, the process of the processing unit 101C is used as a third process.

In the above-described exemplary embodiment, the processing system 1 may include multiple processing apparatuses 10. In this case, the process result may be delivered between the multiple processing apparatuses 10. To deliver data between the multiple processing apparatuses 10, for example, Pub/Sub or messaging may be used.

Figure 7:
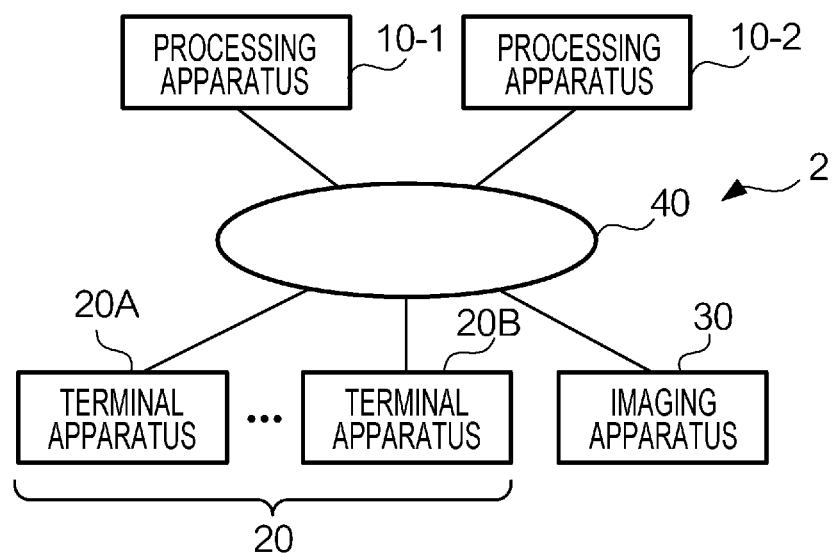
FIG. 7 is a diagram illustrating an example of a processing system according to a modification.

FIG. 7 is a diagram illustrating an example of a processing system 2 according to a modification of the exemplary embodiment. In this example, the processing system 2 includes a processing apparatus 10-1 and a processing apparatus 10-2. In this modification, the processing apparatus 10-1 is used as a first processing apparatus, and the processing apparatus 10-2 is used as a second processing apparatus. The processing apparatuses 10-1 and 10-2 have the same configuration as that of the processing apparatus 10 described above. Note that in the description below, "-1" is suffixed to the reference numeral of each component of the processing apparatus 10-1, and "-2" is suffixed to the reference numeral of each component of the processing apparatus 10-2.

One of processing units 101-1 of the processing apparatus 10-1 transmits process information indicating a process executed by the processing unit 101-1 to a management unit 102-1. A transmission and reception unit 103-1 receives the process information from the processing unit 101-1 and transmits the received process information to all of the processing units 101-1 in the processing apparatus 10-1 and a management unit 102-2 of the processing apparatus 10-2. Subsequent operations of the processing apparatus 10-1 are the same as the operations of the processing apparatus 10 described in the above-described exemplary embodiment. In this modification, one of the multiple processing units 101-1 is used as the first processing unit, a different processing unit 101-1 other than the processing unit 101-1 among the multiple processing units 101-1 is used as the second processing unit, and an acquisition unit 105-1 of the different processing unit 101-1 is used as a first acquisition unit. An acquisition condition used by the acquisition unit 105-1 is used as a first acquisition condition. Further, the process executed by the processing unit 101-1 is used as the first process, and the process executed by the different processing unit 101-1 is used as the second process.

A transmission and reception unit 103-2 of the processing apparatus 10-2 receives the process information from the transmission and reception unit 103-1 and transmits the received process information to all of processing units 101-2 in the processing apparatus 10-2. If the process indicated by the process information received by one of the processing units 101-2 satisfies an acquisition condition specified for the processing unit 101-2, an acquisition unit 105-2 of the processing unit 101-2 acquires the result of the process from the processing unit 101-1. The processing unit 101-2 executes a process by using the result of the process acquired by the acquisition unit 105-2. In this modification, the processing unit 101-2 is used as the third processing unit, the acquisition unit 105-2 of the processing unit 101-2 is used as a second acquisition unit, and the transmission and reception unit 103-2 is used as a reception unit. The acquisition condition used by the acquisition unit 105-2 is used as a second acquisition condition. Further, the process of the processing unit 101-2 is used as the third process.

In this case, the acquisition condition may include a condition specifying whether a process is executed by one of the processing units 101 in the same processing apparatus 10. For example, in one of the processing units 101-2, the result of a process executed by a different processing unit 101-2 in the same processing apparatus 10-2 is worth using, but the result of a process executed by one of the processing units 101-1 in the processing apparatus 10-1 that is a different processing apparatus is not worth using in some cases. In these cases, the acquisition condition for the processing unit 101-2 may include a condition specifying a process executed by the different processing unit 101-2 in the processing apparatus 10-2. In the example illustrated in FIG. 5, the acquisition target information included in the process information includes a host name identifying the processing apparatus 10 to which one of the processing units 101 that executes the process belongs. In this case, whether to satisfy the acquisition condition may be judged on the basis of the host name included in the acquisition target information.

In the above-described exemplary embodiment, the acquisition condition is not limited to the condition using the category, the class, and the additional information of the process. The acquisition condition may be a condition using different information included in the process information. For example, the acquisition condition may be a condition that the issuing date and time included in the process information is within a predetermined range of a time period.

In the above-described exemplary embodiment, whether a process result is worth using may be judged again after a response including the process result is received. In the example illustrated in FIG. 6, the response includes reliability. In this case, if the reliability is lower than or equal to a predetermined degree of reliability, the process result is not considered worth using. Accordingly, it may be judged that the acquisition condition is not satisfied. If it is judged that the acquisition condition is not satisfied, a process may be executed without using the acquired process result.

In the above-described exemplary embodiment, the process information may include the process result itself. In this case, the process information does not have to include the acquisition target information. In this case, the acquisition condition may include a condition specifying a process result considered worth using. For example, if the processing unit 101D executes a process for controlling a robot, and if a process result is text data representing a command for the robot, the processing unit 101D may judge that the acquisition condition is satisfied.

In the above-described exemplary embodiment, when receiving a predetermined number of pieces of process information from the transmission and reception unit 103, each processing unit 101 may judge processes indicated by the respective pieces of process information satisfy respective acquisition conditions. For example, if the predetermined number is 3, the processing unit 101 waits until the processing unit 101 receives three pieces of process information. Upon receiving the third process information, the processing unit 101 proceeds to step S108 described above. In this case, if each of the processes indicated by the process information satisfies the corresponding acquisition condition, the acquisition unit 105 may select one of the results of the respective processes and acquire only the selected process result. If the process information includes the attribute information of the process result, for example, as illustrated in FIG. 6, the selection of the process may be performed on the basis of the attribute information. In the example illustrated in FIG. 6, the process information includes reliability. In this case, the process result having the highest reliability may be selected.

The terms "first", "second", and "third" used herein do not limit an amount or the order of an element for which any of the terms is used. The terms are used for discrimination of two or more elements, and, for example, the ordinal numbers may be used in such a manner as to be changed from each other.

The process steps performed by the processing system 1 are not limited to the example described in the above-described exemplary embodiment. The process steps may be changed from each other as long as the change is consistent. In addition, the disclosure may be provided as a processing method including the process steps performed by the processing system 1.

The disclosure may also be provided as a program run by the processing apparatus 10. The program may be downloaded via a communication network such as the Internet or may be provided in such a manner as to be recorded in a computer-readable recording medium such as a magnetic recording medium (such as a magnetic tape or a magnetic disk), an optical recording medium (such as an optical disk), a magneto-optical recording medium, or a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management system for managing a plurality of processing units, the management system comprising:
   the plurality of processing units including a first processing unit that executes a first process and a second processing unit that executes a second process, wherein the first processing unit is different from the second processing unit;
   a terminal apparatus that transmits a recommendation service request to one of the plurality of processing units, wherein the one of the plurality of processing units processes the recommendation service request to generate an information data;
   a recommendation engine that receives the generated information data from the one of the plurality of processing units, wherein the recommendation engine returns a recommendation information related to the generated information data to the one of the plurality of processing units and the one of the plurality of processing units subsequently returns the recommendation information to the terminal apparatus; and
   a transmission and reception unit that broadcasts, upon completion of the processing the recommendation service request, process information of the first process to the plurality of processing units, wherein the process information is a result of the first process executed by the first processing unit,
   the second processing unit judging whether information included in the process information satisfies an acquisition condition specified for the second processing unit upon receiving the process information broadcasted from the transmission and reception unit, wherein the second processing unit including an acquisition unit that acquires a result of the first process from the first processing unit if the information included the process information satisfies the acquisition condition specified for the second processing unit, wherein the acquisition condition includes a condition specifying the result of the first process being related to the second process to be executed by the second processing unit, and wherein the second processing unit executes the second process by using the acquired result of the first process.

2. The processing apparatus according to claim 1, wherein if the first process satisfies a specified transmission condition, the first processing unit transmits the process information to the transmission and reception unit, and wherein upon receiving the process information from the first processing unit, the transmission and reception unit transmits the received process information to the plurality of processing units.

3. The processing apparatus according to claim 2, wherein the transmission condition includes at least one of an amount of computation in the first process, a resource used for the first process, and cost incurred in the first process.

4. The processing apparatus according to claim 1, wherein the process information is first process information, wherein the transmission and reception unit transmits second process information indicating the second process executed by using the result of the first process to the plurality of processing units, wherein the plurality of processing units include a third processing unit different from the second processing unit, and the third processing unit includes an acquisition unit, wherein if the second process indicated by the second process information received by the third processing unit satisfies an acquisition condition specified for the third processing unit, the acquisition unit acquires a result of the second process, and wherein the third processing unit executes a third process by using the acquired result of the second process.

5. The processing apparatus according to claim 2, wherein the process information is first process information, wherein the transmission and reception unit transmits second process information indicating the second process executed by using the result of the first process to the plurality of processing units, wherein the plurality of processing units include a third processing unit different from the second processing unit, and the third processing unit includes an acquisition unit, wherein if the second process indicated by the second process information received by the third processing unit satisfies an acquisition condition specified for the third processing unit, the acquisition unit acquires a result of the second process, and wherein the third processing unit executes a third process by using the acquired result of the second process.

6. The processing apparatus according to claim 3, wherein the process information is first process information, wherein the transmission and reception unit transmits second process information indicating the second process executed by using the result of the first process to the plurality of processing units, wherein the plurality of processing units include a third processing unit different from the second processing unit, and the third processing unit includes an acquisition unit, wherein if the second process indicated by the second process information received by the third processing unit satisfies an acquisition condition specified for the third processing unit, the acquisition unit acquires a result of the second process, and wherein the third processing unit executes a third process by using the acquired result of the second process.

7. The processing apparatus according to claim 4, wherein if the second process executed by using the result of the first process satisfies a specified transmission condition, the second processing unit transmits the second process information to the transmission and reception unit, and wherein upon receiving the second process information from the second processing unit, the transmission and reception unit transmits the received second process information to the plurality of processing units.

8. The processing apparatus according to claim 5, wherein if the second process executed by using the result of the first process satisfies a specified transmission condition, the second processing unit transmits the second process information to the transmission and reception unit, and wherein upon receiving the second process information from the second processing unit, the transmission and reception unit transmits the received second process information to the plurality of processing units.

9. The processing apparatus according to claim 6, wherein if the second process executed by using the result of the first process satisfies a specified transmission condition, the second processing unit transmits the second process information to the transmission and reception unit, and wherein upon receiving the second process information from the second processing unit, the transmission and reception unit transmits the received second process information to the plurality of processing units.

10. The processing apparatus according to claim 1, wherein the transmission and reception unit transmits the process information to the plurality of processing units by using a method in which an address is not designated.

11. The processing apparatus according to claim 2, wherein the transmission and reception unit transmits the process information to the plurality of processing units by using a method in which an address is not designated.

12. The processing apparatus according to claim 3, wherein the transmission and reception unit transmits the process information to the plurality of processing units by using a method in which an address is not designated.

13. The processing apparatus according to claim 4, wherein the transmission and reception unit transmits the process information to the plurality of processing units by using a method in which an address is not designated.

14. The processing apparatus according to claim 5, wherein the transmission and reception unit transmits the process information to the plurality of processing units by using a method in which an address is not designated.

15. The processing apparatus according to claim 6, wherein the transmission and reception unit transmits the process information to the plurality of processing units by using a method in which an address is not designated.

16. The processing apparatus according to claim 7, wherein the transmission and reception unit transmits the process information to the plurality of processing units by using a method in which an address is not designated.

17. The processing apparatus according to claim 8, wherein the transmission and reception unit transmits the process information to the plurality of processing units by using a method in which an address is not designated.

18. The processing apparatus according to claim 9, wherein the transmission and reception unit transmits the process information to the plurality of processing units by using a method in which an address is not designated.

19. A processing system, for managing a plurality of processing units, comprising:
a first processing apparatus and a second processing apparatus,
the first processing apparatus including the plurality of processing units and a transmission and reception unit,
the plurality of processing units including a first processing unit that executes a first process and a second processing unit that executes a second process, wherein the first processing unit is different from the second processing unit,
a terminal apparatus that transmits a recommendation service request to one of the plurality of processing units, wherein the one of the plurality of processing units processes the recommendation service request to generate an information data;
a recommendation engine that receives the generated information data from the one of the plurality of processing units, wherein the recommendation engine returns a recommendation information related to the generated information data to the one of the plurality of processing units and the one of the plurality of processing units subsequently returns the recommendation information to the terminal apparatus;
the transmission and reception unit broadcasting, upon completion of the processing the recommendation service request, process information of the first process to the plurality of processing units and the second processing apparatus,
the second processing unit including a first acquisition unit that acquires a result of the first process from the first processing unit if the first process indicated by the process information received by the second processing unit satisfies a first acquisition condition specified for the second processing unit,
the second processing unit executing the second process by using the acquired result of the first process,
wherein the second processing apparatus including
a third processing unit and
a reception unit that receives the process information broadcasted from the transmission and reception unit,
the third processing unit including a second acquisition unit that acquires the result of the first process if the first process indicated by the process information received by the reception unit satisfies a second acquisition condition specified for the third processing unit,
the third processing unit executing a third process by using the acquired result of the first process.

20. A non-transitory computer readable medium storing a program causing a computer to execute a process for managing a plurality of proceeding units, the computer including the plurality of processing units including a first processing unit and a second processing unit, the process comprising:
receiving a recommendation service request from a terminal apparatus by one of the plurality of processing units, wherein the one of the plurality of processing units processes the recommendation service request to generate an information data;
transmitting the generated information data from the one of the plurality of processing units, wherein the recommendation engine returns a recommendation information related to the generated information data to the one of the plurality of processing units, and the one of the plurality of processing units subsequently returns the recommendation information to the terminal apparatus;
causing the first processing unit to execute a first process and causing the second processing unit to execute a second process;
broadcasting, upon completion of the processing the recommendation service request, process information of the first process to the plurality of processing units, wherein the process information is a result of the first process executed by the first processing unit;
causing the second processing unit to judge whether information included in the process information satisfies an acquisition condition specified for the second processing unit upon receiving the process information broadcasted from the transmission and reception unit, and causing the second processing unit to acquire a result of the first process from the first processing unit if the information included the process information satisfies the acquisition condition specified for the second processing unit; and
causing the second processing unit to execute a second process by using the acquired result of the first process,
wherein the acquisition condition includes a condition specifying the result of the first process being related to the second process to be executed by the second processing unit.

* * * * *